Patented May 30, 1950

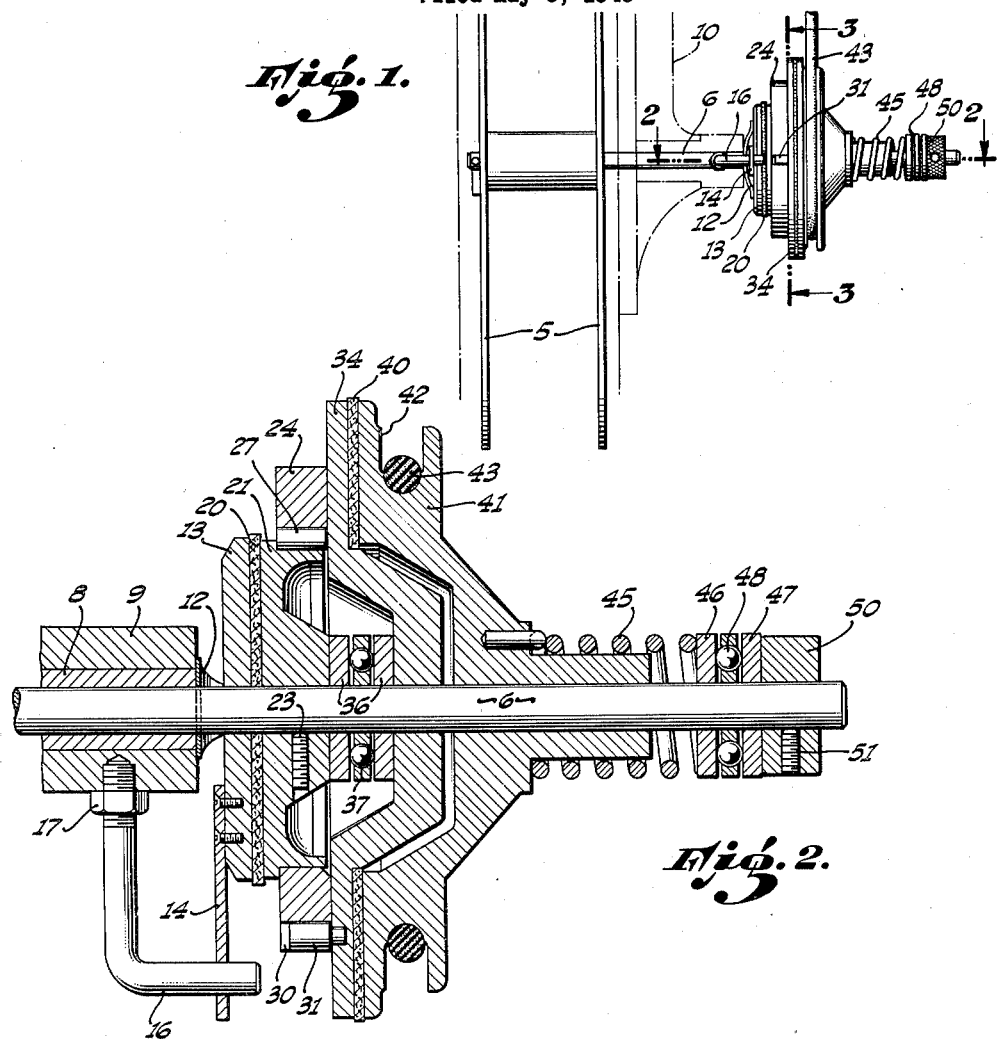
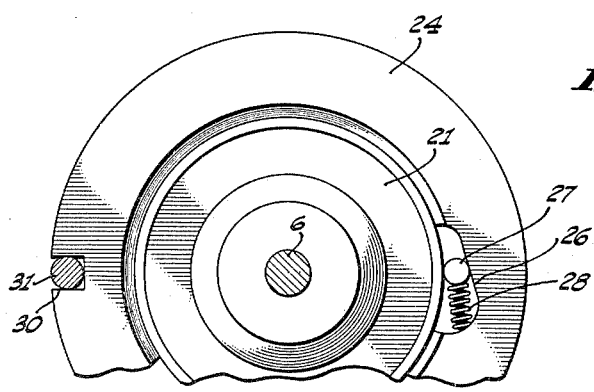

2,509,791

UNITED STATES PATENT OFFICE 2,509,791

REVERSIBLE SPINDLE

Harold G. Swanson, North Hollywood, Calif., assignor to Republic Productions, Incorporated, a corporation of New York Application May 3, 1946, Serial No. 667,224

9 Claims. (Cl. 242—55)

This invention relates to motion picture film drive systems, and particularly to a reversible spindle mechanism wherein a film reel may be rotated in one direction to take up film and rotated in the opposite direction to supply film.

Film reel mechanisms of this general type are well-known in the art, reference being made to Ross U. S. Patent No. 2,217,183 of October 8, 1940, in which a double over-running clutch and single adjusting spring are disclosed and claimed, and reference also being made to Underhill U. S. Patent No. 2,385,479 of September 25, 1945, in which a ratchet mechanism with a single adjusting spring are disclosed and claimed. The present invention is directed to a mechanism having the same functions as the above-mentioned spindles, but is of a simplified type with a minimum of standard parts which may be quickly assembled, dismantled, and reassembled for the replacement of worn elements when required. The mechanism is particularly reliable in operation. The spindle not only provides the proper frictional drag or rotating driving torque on the reel when used as a take-up reel, but it also provides a different and reduced holdback rotational torque when the reel serves as a supply reel. The adjustment of each torque is separate and individual, and may be very quickly made.

The principal object of the invention, therefore, is to facilitate the take-up and supply of film from a film reel.

Another object of the invention is to provide a spindle for a film reel which may be used both for taking up and supplying film when rotated in opposite directions.

A further object of the invention is to provide an improved, combined take-up and supply reel combination which has a greater frictional winding torque than frictional drag torque.

A still further object of the invention is to provide an improved over-running clutch mechanism for a combination supply and film reel spindle.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a side view of the combination take-up and supply reel spindle mechanism embodying the invention.

Fig. 2 is an enlarged cross-sectional view of the spindle mechanism taken along the line 2—2 of Fig. 1, and Fig. 3 is a partial sectional plan view of the over-running clutch mechanism taken along the line 3—3 of Fig. 1.

Referring now to the drawings, in which the same numerals identify like elements, a film reel 5 is mounted on a shaft 6, the shaft being adapted to rotate in a bearing 8 on a support 9 which may be part of the housing 10 of the film reel magazine. Starting from the bearing 8 and going to the right in the drawing, the first element of the spindle is a holdback clutch adjustment leaf spring 12, the ends of which bear against a holdback clutch plate 13 having an arm 14 extending therefrom. Inserted in an aperture at the end of the arm 14 is a bell crank arm 16 fixedly attached to the support 9 by being threaded therein and held in position by a nut 17. Thus, the plate 13 is held stationary along with the spring 12.

The next element is a holdback felt clutch disc 20 in contact with an inner over-running clutch race 21 which is fixedly attached to the shaft 6 by set screw 23. The elements so far described will provide a certain drag on the shaft 6 when rotated by the film pull when the reel 5 is used as a supply reel, the amount of drag being determined by the tension in the spring 12.

Surrounding the inner clutch race is an outer clutch race 24 in which is provided a tapered notch 26 within which is a roller pin 27 and a spring 28. Referring now to Fig. 3, it will be noted that if the outer race 24 is driven counterclockwise and the inner race is stationary or has a speed less than that of the outer race 24, the pin 27 will not connect the outer race to the inner race. However, if the outer race is driven in a clockwise direction, the pin 27 will bind the outer race to the inner race and the inner race will, therefore, be driven at the same speed as the outer race.

In the outer race 24, a notch 30 is cut which accommodates a drive pin 31 fastened to the next element, or drive plate 34. The drive plate 34 is cup shaped, and to provide relative motion between the plate and the inner race 21, a thrust bearing is provided made up of washers 36 and a ball bearing 37. Positioned against the outer flat surface of the drive plate 34 is a felt clutch disc 40 which separates the plate 34 and a drive pulley 41, the latter having a V-notch 42 therein, in which is a drive belt 43. It will be noted that a space exists between the drive plate 34 and the drive pulley 41 so that all pressure is against the surface of the felt disc 40.

Mounted on the shank of the drive pulley 41 is a spring 45 which bears against the drive pulley 41 and against a washer 46 of a thrust bearing made up of a washer 46, a washer 47, and a bearing 48. The thrust bearing is held in position by an adjusting nut 50 having a set screw 51.

To adjust the bearing pressure between the drive plate 34, the felt disc 40, and the drive pulley 41, the nut 50 may be moved along the shaft 6. The operation of the above-described spindle is that when the reel is to be used as a take-up reel, the belt 43 drives the pulley 41 in a direction so that the plate 34 and outer race 24 are driven in a clockwise direction. Through the over-running clutch mechanism 26, 27, and 28, the outer race 24 drives the inner race 21 which is fixed to the shaft 6. Since the shaft 6 has a varying speed determined by the diameter of the film reel as it increases with the film being wound thereon, and, since the rotational speed of the drive pulley 41 is constant, there is slippage between the drive pulley 41 and the drive plate 34 to accommodate the discrepancy in speed. Sufficient rotational torque, however, must be applied to drive the reel at all times, and this is obtained through the adjustment of the nut 50 to vary the tension of the spring 45.

When the reel 5 is used as a supply reel, it is reversed in direction by the film pull, and the inner race 21 is rotated in a counterclockwise direction. Simultaneously, the direction of rotation of the pulley 41 is reversed, which rotates the outer race 24 also in a counterclockwise direction, but at a greater speed than that of the inner race 21. Thus, there is no connection between the two races and the amount of drag placed on the shaft 6 is that determined by the bearing pressure between the plate 13, the felt disc 20, and the inner race 21. Once the proper tension of spring 12 is established, no further adjustment is required over a long period of use.

Thus, the above mechanism is sturdy and has a minimum of parts which are particularly reliable in operation, since substantially all the elements are parts of a standard one-way spindle clutch. The parts are dismantled from the shaft 6 simply by removing the set screws 23 and 51 and sliding the parts off the end of the shaft.

I claim:

1. A reversible film reel mechanism adapted to take up film when rotated in one direction and to rotate in the opposite direction when supplying film, comprising a shaft, a film reel attached to said shaft, a member fixedly mounted on said shaft, frictional tensioned means bearing against said member, a driving member surrounding said fixedly mounted member and adapted to drive said member when said driving member is rotated in a certain direction, a second driving member, and a second frictional tensioned means interposed between said two driving members, said shaft and all of said members being rotatable on the same axis.

2. A mechanism in accordance with claim 1, in which a spring is provided for said first mentioned frictional tensioned means, and a separate spring is provided for said second mentioned frictional tensioned means.

3. A reversible film reel mechanism adapted to take up film when rotated in one direction and to rotate in the opposite direction when supplying film, comprising a shaft, a film reel attached to said shaft, a member fixedly mounted on said shaft, frictional tensioned means bearing against said member, a driving member surrounding said fixedly mounted member and adapted to drive said member when said driving member is rotated in a certain direction, a second driving member, and a second frictional tensioned means interposed between said two driving members, said first mentioned frictional means including a felt disc bearing against said fixed member, a stationary plate bearing against said felt disc, and a spring bearing against said stationary plate.

4. A reversible film reel mechanism adapted to take up film when rotated in one direction and to rotate in the opposite direction when supplying film, comprising a shaft, a film reel attached to said shaft, a member fixedly mounted on said shaft, frictional tensioned means bearing against said member, a driving member surrounding said fixedly mounted member and adapted to drive said member when said driving member is rotated in a certain direction, a second driving member, and a second frictional tensioned means interposed between said two driving members, said second mentioned frictional means including a felt disc bearing against opposing surfaces of said driving members and a spring bearing against said second driving member.

5. A reversible film reel mechanism comprising a shaft, an inner over-running clutch race fixedly attached to said shaft, an outer clutch race attachable to said inner clutch race when said outer race is rotated in one direction with respect to said inner race and detachable from said inner race when said outer race is rotated in the opposite direction, a fixed plate, a frictional element between said plate and said inner clutch race to resist rotation of said inner race, a driving plate, and a second frictional element between said plate and said outer clutch race to permit a differential in speed between said driving plate and said outer race.

6. A reversible film reel mechanism in accordance with claim 5, in which a tensioning means is provided for said first mentioned frictional element and a second tensioning means is provided for said second mentioned frictional element.

7. A reversible film reel mechanism in accordance with claim 5, in which said first mentioned frictional element includes a felt disc and said second mentioned frictional element includes a felt disc of a different size from said first belt disc.

8. A reversible film reel mechanism comprising a shaft, a reel mounted on one end of said shaft, and a drive and holdback mechanism mounted on the other end of said shaft including an over-running clutch race fixed to said shaft, frictional means for imparting a drag to said race when said reel and shaft are rotated in one direction, a tensioning means for said frictional means, an outer clutch race adapted to drive said inner clutch race when said outer clutch race is rotated in one direction, means for frictionally driving said outer clutch race in said one direction, and tensioning means for said frictional driving means, all of the elements mentioned above having a common axis.

9. A reversible film reel mechanism in accordance with claim 8, in which said first mentioned means includes a friction plate bearing against the face of said inner race and said last mentioned means includes a friction plate bearing against the face of said outer race.

HAROLD G. SWANSON.

REFERENCES CITED

The following references are of record in the file of this patent:

UNITED STATES PATENTS

| Number | Name | Date |
| --- | --- | --- |
| 2,257,172 | Klemola | Sept. 30, 1941 |
| 2,325,885 | Serrurier | Aug. 3, 1943 |